| 
US008516226B1

(12) United States Patent
Collard et al.

(10) Patent No.: US 8,516,226 B1
(45) Date of Patent: Aug. 20, 2013

(54) EXECUTING A PREFETCHING POLICY RESPONSIVE TO ENTRY INTO AN EXECUTION PHASE OF AN APPLICATION

(75) Inventors: Jean-Francois Collard, Sunnyvale, CA (US); Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1209 days.

(21) Appl. No.: 11/337,425

(22) Filed: Jan. 23, 2006

(51) Int. Cl.
    *G06F 9/30*  (2006.01)
(52) U.S. Cl.
    USPC ............ 712/207; 711/137; 712/220; 712/229
(58) Field of Classification Search
    USPC ........................................................ 711/137
    See application file for complete search history.

(56) References Cited

U.S. PATENT DOCUMENTS

| | | | | |
|---|---|---|---|---|
| 4,435,759 A * | 3/1984 | Baum et al. | ...................... | 714/44 |
| 5,778,435 A * | 7/1998 | Berenbaum et al. | .......... | 711/137 |
| 5,937,203 A * | 8/1999 | Lee et al. | ......................... | 712/43 |
| 6,055,650 A * | 4/2000 | Christie | ........................... | 714/39 |
| 6,098,154 A * | 8/2000 | Lopez-Aguado et al. | .... | 711/137 |
| 6,157,993 A * | 12/2000 | Lewchuk | ......................... | 711/213 |
| 6,963,954 B1 * | 11/2005 | Trehus et al. | .................. | 711/137 |
| 6,983,356 B2 * | 1/2006 | Rotithor et al. | ................ | 711/213 |
| 7,103,757 B1 * | 9/2006 | Kashyap | ......................... | 712/237 |
| 2003/0088864 A1 * | 5/2003 | Tirumalai et al. | .............. | 717/160 |
| 2004/0103129 A1 * | 5/2004 | Flores et al. | ................... | 708/200 |
| 2004/0103408 A1 * | 5/2004 | Chilimbi et al. | ............... | 717/140 |
| 2004/0111708 A1 * | 6/2004 | Calder et al. | ................... | 717/131 |
| 2004/0216097 A1 * | 10/2004 | Sun | ................................ | 717/154 |
| 2005/0114605 A1 * | 5/2005 | Iyer | ................................ | 711/133 |

OTHER PUBLICATIONS

"The performance of runtime data cache prefetching in a dynamic optimization system", Jiwei Lu Chen, H. Rao Fu Wei-Chung Hsu Othmer, B. Pen-Chung Yew Dong-Yuan Chen, Microarchitecture, 2003. MICRO-36. Proceedings. 36th Annual IEEE/ACM International Symposium on Publication Date: Dec. 3-5, 2003 on pp. 180-190.*
Dhodapkar et al. (Comparing program phase detection techniques); Proceedings of the 36th annual IEEE/ACM International Symposium on Microarchitecture; 2003.*
Sherwood et al. (Phase tracking and prediction) ; Computer Architecture, 2003. Proceedings. 30th Annual International Symposium on; Publication Date: Jun. 9-11, 2003.*
Luk et al. (Profile-Guided Post-Link Stride Prefetching) ; Proceedings of the 16th international conference on Supercomputing; Year of Publication: 2002.*

* cited by examiner

*Primary Examiner* — Keith Vicary

(57) ABSTRACT

A method and system for flexible prefetching of data and/or instructions for applications are described. A prefetching mechanism monitors program instructions and tag information associated with the instructions. The tag information is used to determine when a prefetch operation is desirable. The prefetching mechanism then requests data and/or instructions. Furthermore, the prefetching mechanism determines when entry into a different execution phase of an application program occurs, and executes a different prefetching policy based on the application's program instructions and tag information for that execution phase as well as profile information from previous executions of the application in that execution phase.

14 Claims, 6 Drawing Sheets

EXECUTING A PREFETCHING POLICY RESPONSIVE TO ENTRY INTO AN EXECUTION PHASE OF AN APPLICATION

BACKGROUND

The present invention relates generally to data processing techniques and systems and, more particularly, to prefetching techniques and systems.

A shared-memory multiprocessor can be described as a set of processors, memory, cell controllers and an interconnect (the latter two elements sometimes being collectively referred to as a "chipset"). The processors are clustered in cells and a dedicated chip (the cell controller) serves as an interface between the cell's processors, on the one hand, and memory and the interconnection network to other cells, on the other hand. When an application running on a processor needs some data or instructions, e.g., because a load instruction missed in all caches local to the processor, a request for that data and/or instructions is sent by the processor to the cell controller. The cell controller forwards the request to other cell controllers and/or to main memory to obtain the requested data or instructions, however the delay associated with external requests for data introduces undesirable latency and should be minimized.

One technique used to reduce the latency associated with cache misses is known as prefetching. Prefetching refers to requesting and storing data or instructions in advance of it being requested by an application to avoid cache misses. Since cache memory space is limited, it is not possible to prefetch all of the data or instructions which potentially may be requested by applications. Thus, prefetching involves speculation as to which data or instructions will be needed in the near future by an application.

Various prefetching mechanisms are currently available. For example, software prefetching involves advance data requests initiated by application code (i.e., the prefetching instructions are embedded in the application code) or by a helper thread, in either case running on a processor of the cell. A helper thread can eavesdrop on the stream of requests made by the application threads, speculate as to which data requests will be next, prefetch that data and store it in cache memory. Alternatively, the helper thread can execute those portions of the application code that compute target addresses such that the helper thread has advance knowledge of potentially needed data and can initiate a prefetch sequence. However, software prefetchers generally require sophisticated compiler technology, which is nonetheless frequently unable to compute target addresses sufficiently in advance of the application's need for data. Moreover, these software prefetchers require significant processor bandwidth, thereby reducing the amount of that valuable resource available to the primary software applications running on the system.

Prefetching mechanisms can also be implemented in hardware. For example, a hardware prefetcher can be implemented on the processor running the primary software application. This engine can observe the behavior of the application, e.g., the stream of data requests that the application makes, speculate as to the data that will be required to satisfy future requests and prefetch that data. Alternatively, hardware prefetchers can be implemented in the cell controllers and/or the interconnect. These hardware prefetching mechanisms are hampered by their relative inability to properly guess upcoming target addresses of the applications, as well as the correct timing for prefetching data from those target addresses.

Accordingly, it would be desirable to provide systems and methods for flexibly prefetching data and instructions which would overcome these drawbacks and limitations.

SUMMARY

Systems and methods according to the present invention address this need and others by providing techniques for prefetching data and/or instructions using trace indication information in addition to the program instructions themselves.

According to one exemplary embodiment of the invention, a method for prefetching for an application running on a data processing system includes the steps of monitoring, by a prefetching mechanism, program instructions and trace indication information, determining that a prefetch operation is desirable using the trace indication information and prefetching one of data and other instructions in response to the determining step.

According to another exemplary embodiment of the invention, a prefetching system includes an interconnect via which program instructions and trace indication information are conveyed and a prefetching mechanism for monitoring the program instructions and trace indication information, for determining that a prefetch operation is desirable using said trace indication information and for prefetching one of a block of data and an instruction and storing same in a cache memory device.

According to another exemplary embodiment of the present invention, a prefetching method includes the steps of generating, by an application running on at least one processor in a cell, prefetching code, downloading the prefetching code to a chipset connected to the at least one processor and prefetching at least one of data and instructions for the application using the prefetching code running on the chipset.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1A:
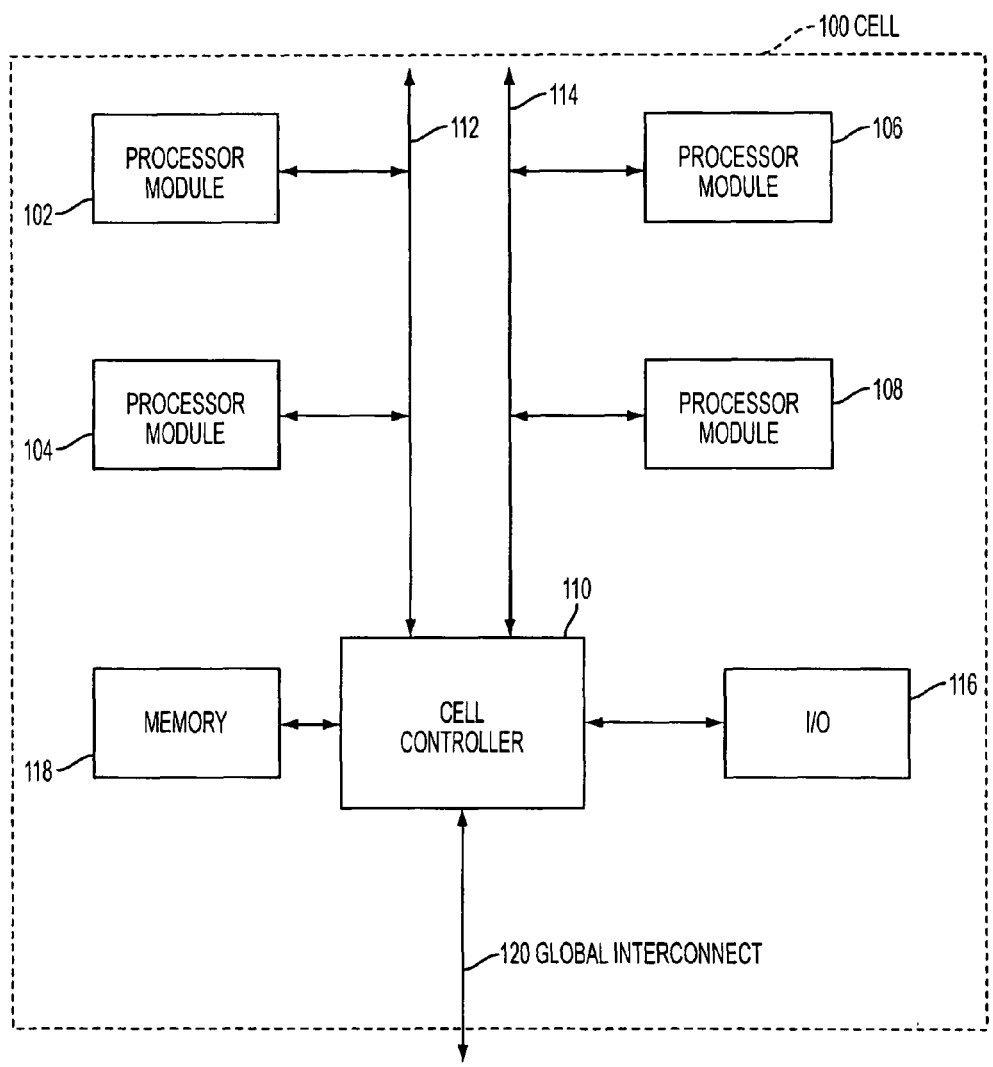
FIG. 1(A) illustrates a cell of a processing system in which exemplary embodiments of the present invention can be employed.
Figure 1B:
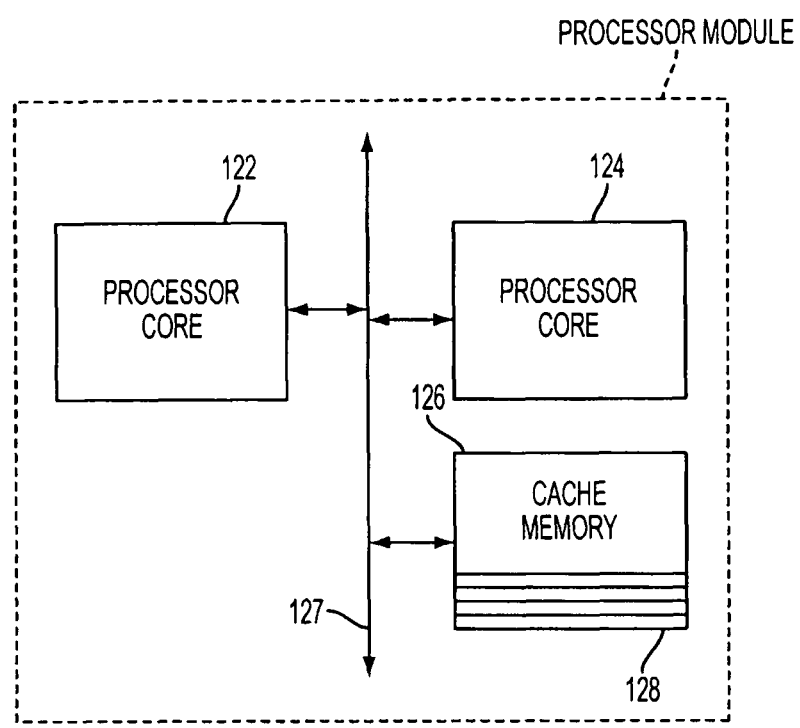
FIG. 1(B) illustrates a processor module of the cell of FIG. 1(A)

Prior to discussing techniques for prefetching data according to exemplary embodiments of the present invention, an exemplary system in which such techniques can be implemented is described below in order to provide some context. With reference to FIG. 1(A), one cell 100 of a processing system is illustrated. The cell includes four processor modules 102-108 linked to a cell controller 110 via interconnects 112 and 114. Each processor module 102-108 can include, for example, two processor cores 122 and 124 and a cache memory 126 which communicate via an interconnect 127 as shown in FIG. 1(B). The cache memory 126 includes a number of cache lines 128 each of which contain an amount of information which can be replaced in the cache memory 126 at one time, e.g., one or a plurality of data words or instructions. The size of the cache lines 128 will vary in different implementations, e.g., based on the data widths of the interconnects 112, 114, 120 and 127. The cell controller 110 is connected to I/O device 116 and memory device 118, as well as to a global interconnect 120.

Figure 2:
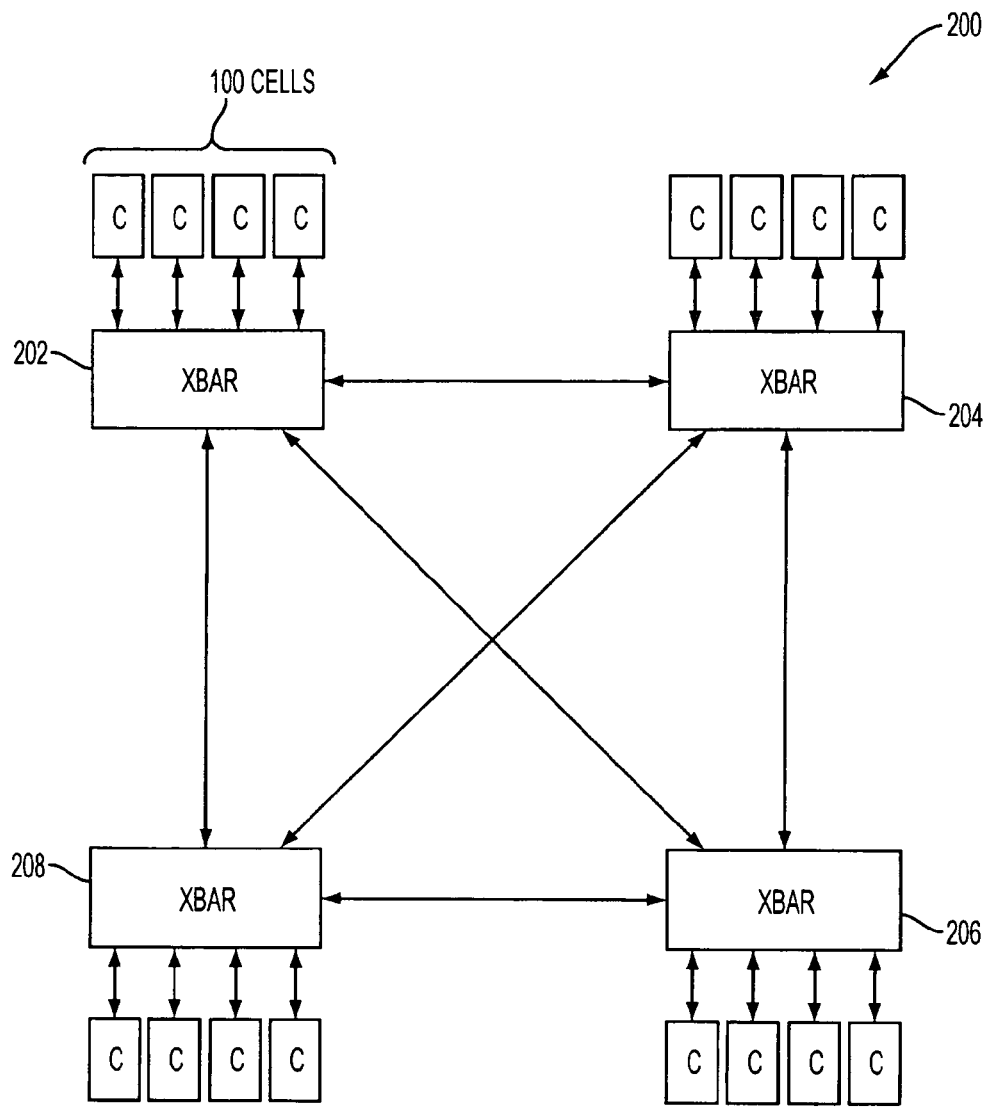
FIG. 2 illustrates a processing system including a plurality of cells in which exemplary embodiments of the present invention can be employed.

A plurality of cells 100 can be interconnected as shown in FIG. 2 to form an exemplary processing system 200. Therein, four cells (C) 100 are each directly connected to each of crossbar devices 202-208. The cache lines 128 associated with the processing system 200 can (from a processor core's perspective) have a state of either modified (i.e., dirty), exclusive (i.e., clean), shared or invalid and (from a cell controller's perspective) have a state of idle, shared or private. It will be appreciated that the particular architecture shown in FIGS. 1(a), 1(b) and 2, as well as cache line states, are purely exemplary and that the present invention can be implemented in processing systems having different architectures.

The processor cores 122, 124 each have access to a program counter (not shown) which contains the address of the next instruction to be executed by the application being run by that processor core, which provides a numeric index to program instructions. The program counter (PC) value increments each time another instruction is executed. Since the processor cores 122, 124 have access to program counters, individual instructions causing various events within the processor modules 102-108, e.g., cache misses, can be identified when these events occur. This knowledge enables corrective action, e.g., prefetching, to be performed for subsequent executions of the same or similar instructions. However, when an instruction is sent for execution outside of the processor modules 102-108, e.g., to another system component, that system component may not have access to a program counter and, accordingly, cannot readily correlate executed instructions with undesirable system events.

One technique for resolving this problem is for the processor core 122, 124 to send a tag or identification code along with each instruction to be executed by a system component. The identification code for an instruction can, for example, include a combination of the program counter, the processor identification and/or the processor thread identification. If an event, e.g., a cache miss, occurs as a result of a system component's handling of the tagged instruction, then the system component is able to log sufficient information to enable useful debugging of the application code despite the fact that the system component does not have direct access to the program counter. For more details relating to exemplary systems and techniques for generating and using such tags, the interested reader is referred to U.S. patent application Ser. No. 11/030,938, filed on Jan. 7, 2005, entitled "Methods and Systems for Associating System Events With Program Instructions", the disclosure of which is incorporated here by reference.

Figure 3:
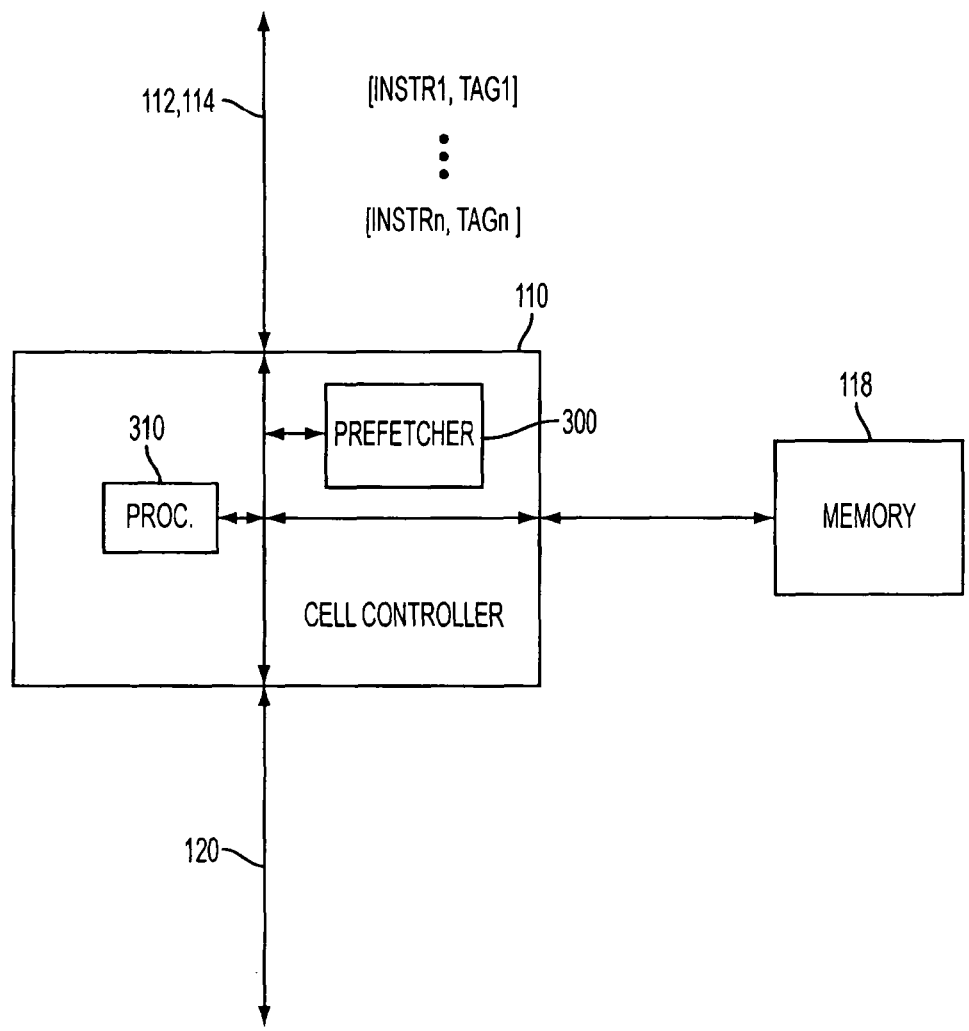
FIG. 3 illustrates a prefetching mechanism in a cell controller according to an exemplary embodiment of the present invention.

According to exemplary embodiments of the present invention, the trace indication information which is available from such tags can also be used to improve prefetching techniques and devices. For example, according to one exemplary embodiment of the present invention, prefetcher 300 can be a fixed (i.e., not programmable) hardware device disposed in a cell controller 110 as shown in FIG. 3. The fixed prefetcher 300 can monitor (snoop) the requests for data and/or instructions which are passed from the local interconnects 112, 114 through the cell controller 110 as guided by processor 310. Alternatively, cell controller 110 may not have a processor 310 on board but may have a helper processor for providing intelligence thereto or may lack processor intelligence entirely. According to this exemplary embodiment, those requests will include a sequence of instructions and associated tags and the prefetcher 300 uses the trace indication information provided in the tags to improve its ability to speculate as to which target addresses are likely to be requested by the processor modules 102-108 and/or the timing of those requests.

More specifically, but purely as an example, the prefetcher 300 can use the thread and/or processor core ID provided in the tags to determine which thread(s) and/or processor core(s) are generating the most cache misses and then allocate more prediction resources to those thread(s) or core(s). Moreover, by knowing the current PC value from the tag, the prefetcher 300 will be able to more readily prefetch instructions, which can significantly improve the performance of certain applications running on the system (e.g., database applications). Additionally, or alternatively, prefetcher 300 can use the tag information to detect loops in the application code, thereby more easily detecting code patterns to improve speculation as to target addresses and timing. For example, the prefetcher 300 can log, for each thread running in a cell 100, a history of cache misses and the associated PC values. Then, when one of the stored PC values is detected again by the prefetcher 300, e.g., because the corresponding instructions are part of a code loop, the prefetcher 300 can more easily compute strides between misses as an aid to predicting future prefetch addresses.

Alternatively, prefetcher 300 need not be fixed, but can instead be programmable. A user (application) can create prefetching software and download that software to the prefetcher 300. A compiler can generate both a binary file for the primary application and a binary file that will aid in the execution of that application. For example, the compiler can generate one prefetch binary file per application thread, or one for the set of threads that will be running on a single cell 100 if there is one prefetcher 300 per cell 100. Like the previous exemplary embodiment employing a fixed prefetcher, programmable prefetchers in accordance with exemplary embodiments of the present invention can also evaluate tag information to make prefetching decisions. For example, such prefetching software will include functionality like that of the following pseudocode snippet:

If (TAG==Y);
Then Prefetch X;

where values of Y represent tag information values which are selected to optimize prefetch timing and values of X are target addresses which are selected to optimize prediction accuracy.

Programmable prefetchers in accordance with the present invention can take many forms. For example, in one embodiment, the prefetching software can be written and executed using the same instruction set architecture as the host processor. However since the prefetcher 300 will typically be smaller and have more limited functionality than the host processor, the prefetcher 300 may alternatively have its own, smaller instruction set architecture. According to one exemplary embodiment of the present invention, a programmable prefetcher can be implemented as a field-programmable logic array (FPGA) in the chipset and the software which generates the prefetching program can generate FPGA configuration bitstreams to implement prefetching based on incoming tag information.

Prefetching software in accordance with exemplary embodiments of the present invention can be generated by a modified compilation system, e.g., using knowledge of the primary application's source code as well as profile information from previous executions of that application. Different prefetching programs can be loaded at different points in the execution of a single program, or the prefetching program can have different modes which are enabled by writing to I/O device registers (not shown) by the primary application.

Other exemplary embodiments of the present invention can use the tag information (e.g., PC values) monitored by prefetcher 300 to keep track of execution phases of the applications running on processor modules 102-108 and use that knowledge to adapt prefetching behavior. For example, prefetch software can be designed to prefetch instructions more often than data when an application enters a phase known from previous runs to suffer more from instruction-cache misses than data cache misses. Moreover, prefetching software in accordance with the present invention can change its data prefetching policies based on information collected in prior runs of the application. For example, the prefetching software can use content prefetching during a first phase of an application's execution and stride prefetching in a second phase of that program's execution. This latter example may be useful when, for example, the compiler has detected that the first phase of the application involves significant pointer chasing and the second phase of the application involves accessing a large array. The prefetching software will know when to change prefetching policies since it knows the PC value ranges of both of the code sections corresponding to the first and second phases.

Although the foregoing exemplary embodiments have been described in connection with prefetchers that monitor tag information being sent along with instructions from processors, the present invention is not limited thereto. Prefetching in accordance with the present invention can involve the monitoring and/or use of any trace indication, e.g., information which indicates the progress of program execution, which is available. For example, another technique for correlating system events with program instructions involves a probabilistic correlation using markers which are associated with instructions that are determined a priori to be instructions which are likely to cause system events, e.g., cache misses. When the program is executed, and a system event occurs, an instruction that is likely to have caused that event can be identified using the markers which have been inserted into the program. This technique is described in more detail in U.S. patent application Ser. No. 11/337,457, to Jean-Francois Collard et al., entitled "Probabilistic Correlation of System Events with Program Instructions, filed concurrently herewith, the disclosure of which is incorporated by reference. The trace information derived from such markers can also be used to improve prefetching techniques in similar ways to those described above.

Figure 4:
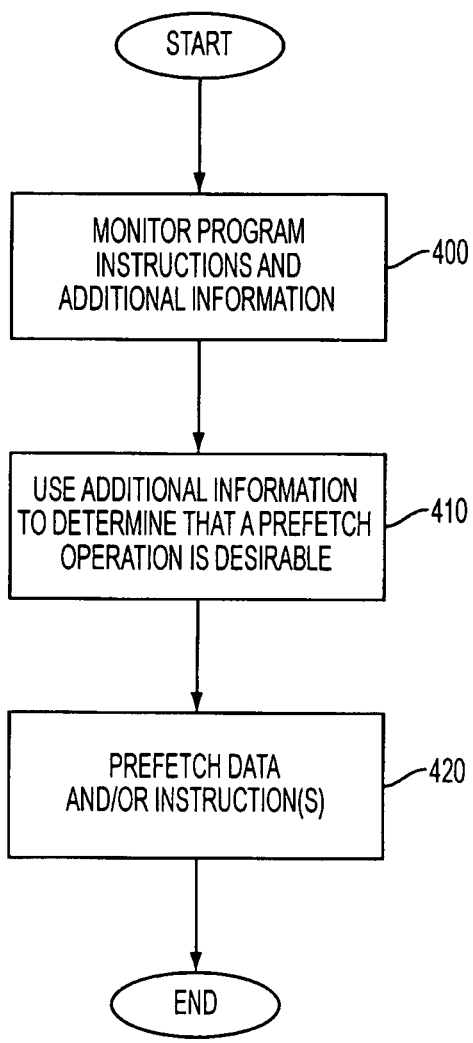
FIG. 4 is a flowchart depicting a method for prefetching according to an exemplary embodiment of the present invention.

Thus, a general method for prefetching in accordance with exemplary embodiments of the present invention is illustrated in the flowchart of FIG. 4. Therein, at step 400, a prefetching mechanism monitors program instructions and trace indication information (e.g., tags containing PC values which are associated with each program instructions, markers embedded between instructions or other trace information). Using this trace indication information, the prefetching mechanism then determines that a prefetch operation is desirable at step 410. The prefetching mechanism then requests the data and/or instruction in response to this determination at step 420.

Figure 5:
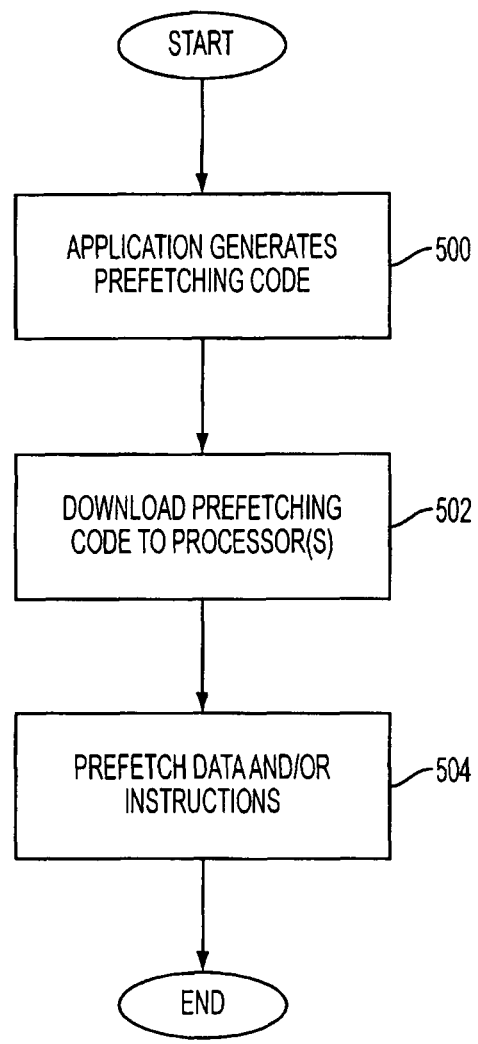
FIG. 5 is a flowchart depicting another method for prefetching according to an exemplary embodiment of the present invention.

Another prefetching method according to an exemplary embodiment of the present invention is illustrated in FIG. 5. Therein, at step 500, an application running on at least one processor in a cell, generates prefetching code. The prefetching code is downloaded to a chipset connected to the at least one processor at step 502. This prefetching code is then used to prefetch at least one of data and instructions for the application at step 504.

Moreover, prefetching mechanisms in accordance with the present invention are not limited to those which use trace indication information to enhance the accuracy of prefetching predictions. For example, according to one exemplary embodiment of the present invention, a prefetching system includes an interconnect and a cell controller having a software prefetching mechanism for prefetching data and/or instructions, wherein the software prefetching mechanism includes prefetching code which is downloaded to the cell controller, i.e., a software prefetching mechanism resident in the chipset. Such software prefetching mechanisms provide, among other things, chipsets which are able to provide a better allocation of prefetching resources (e.g., history tables on which predictions are based), allocating more resources to late processors. Additionally, chipsets which incorporate software prefetching mechanisms according to this exemplary embodiment can also take advantage of their knowledge of the system coherence protocol in their performance of data and/or instruction prefetching e.g., to avoid false sharing problems. Consider for example a cell-based multiprocessor wherein the processors assume so-called snoop-based coherency, but the cell controller translates snoop messages into directory-based requests. Since prefetching can have a detrimental effect in multi-processor systems (e.g., because one processor may still own a cache line that it does not really need relative to another processor that does need that cache line), knowledge of the coherence protocol by the prefetcher can be useful in avoiding this problem.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The foregoing description of exemplary embodiments of the present invention provides illustration and description, but it is not intended to be exhaustive or to limit the invention to the precise form disclosed. Numerous variations and permutations are contemplated by the present invention. The following claims and their equivalents define the scope of the invention.

The invention claimed is:

1. A method for flexible prefetching for an application running on a data processing system, the method comprising:

monitoring, by a prefetching mechanism, program instructions of the application and program tag information associated with the program instructions for determining when entry into an execution phase has occurred, wherein said tag information includes at least one of: processor identifications and thread identifications;

responsive to entry of a first execution phase of the application, executing a first prefetching policy based on the application's program instructions and associated tag information as well as profile information from previous executions of the application in the first execution phase; and responsive to entry of a second different execution phase of the application, executing a second different prefetching policy based on the application's program instructions and associated tag information as well as profile information from previous executions of the application in the second different execution phase.

2. The method of claim 1, further comprising:
submitting, by a processor, an instruction and a corresponding tag containing said tag information to a chipset for handling.

3. The method of claim 2, wherein said prefetching mechanism is programmable and the method further comprises:
downloading a respective prefetching routine from a processor outside of a chipset to said prefetching mechanism responsive to entry into a corresponding execution phase of the application, wherein the prefetching routine is executed on a hardware device of the prefetching mechanism.

4. The method of claim 1, wherein said first execution phase involves pointer chasing and the first prefetching policy is content prefetching and wherein the second execution phase involves accessing an array and the second prefetching policy is stride prefetching.

5. The method of claim 1, wherein said tag information includes markers which are associated during compilation with program instructions in the application that have previously been determined to cause system events.

6. The method of claim 1, wherein executing the first prefetching policy is in response to detecting entry into a first range of program counter values associated with a first section of the application's program instructions corresponding to the first execution phase, and
wherein executing the second prefetching policy is in response to detecting entry into a second range of program counter values associated with a second section of the application's program instructions corresponding to the second execution phase.

7. The method of claim 6, wherein the profile information from previous executions of that application in the first execution phase comprises profile information from previous executions of the first section of the application's program instructions associated with the first range of program counter values, and
wherein the profile information from previous executions of that application in the second execution phase comprises profile information from previous executions of the second section of the application's program instructions associated with the second range of program counter values.

8. The method of claim 1, wherein the prefetching mechanism includes a hardware device.

9. A flexible prefetching system comprising:
a plurality of processors;
an interconnect via which program instructions of an application and associated tag information are conveyed from the plurality of processors, wherein said tag information includes at least one of: processor identifications and thread identifications; and
a cell controller connected to said interconnect, said cell controller including a prefetching mechanism for monitoring said program instructions and the associated tag information, for determining when entry into an execution phase of the application has occurred;
the cell controller, responsive to entry of a first execution phase of the application, to execute a first prefetching policy based on the application's program instructions and associated tag information as well as profile information from previous executions of the application in the first execution phase; and
the cell controller, responsive to entry of a second different execution phase of the application, to execute a second different prefetching policy based on the application's program instructions and associated tag information for the second execution phase as well as profile information from previous executions of the application in the second execution phase.

10. The system of claim 9, wherein said first execution phase involves pointer chasing and the first prefetching policy is content prefetching and wherein the second execution phase involves accessing an array and the second prefetching policy is stride prefetching.

11. The system of claim 9, wherein said prefetching mechanism is programmable and wherein a respective prefetching routine is downloaded from one of said plurality of processors to said prefetching mechanism within said cell controller responsive to entry into a corresponding execution phase of the application.

12. The system of claim 9, wherein said tag information includes markers which are associated during compilation with program instructions in the application that have previously been determined to cause system events.

13. The flexible prefetching system of claim 9, wherein the first prefetching policy is executed in response to detecting entry into a first range of program counter values associated with a first section of the application's program instructions corresponding to the first execution phase, and
wherein the second prefetching policy is executed in response to detecting entry into a second range of program counter values associated with a second section of the application's program instructions corresponding to the second execution phase.

14. The flexible prefetching system of claim 13, wherein the profile information from previous executions of the application in the first execution phase comprises profile information from previous executions of the first section of the application's program instructions associated with the first range of program counter values, and
wherein the profile information from previous executions of the application in the second execution phase comprises profile information from previous executions of the second section of the application's program instructions associated with the second range of program counter values.

* * * * *